E. S. PHELPS.
VIBRATION RECORDER FOR AUTOMOBILES AND OTHER VEHICLES.
APPLICATION FILED AUG. 17, 1920.
1,408,635.
Patented Mar. 7, 1922.
3 SHEETS—SHEET 1.
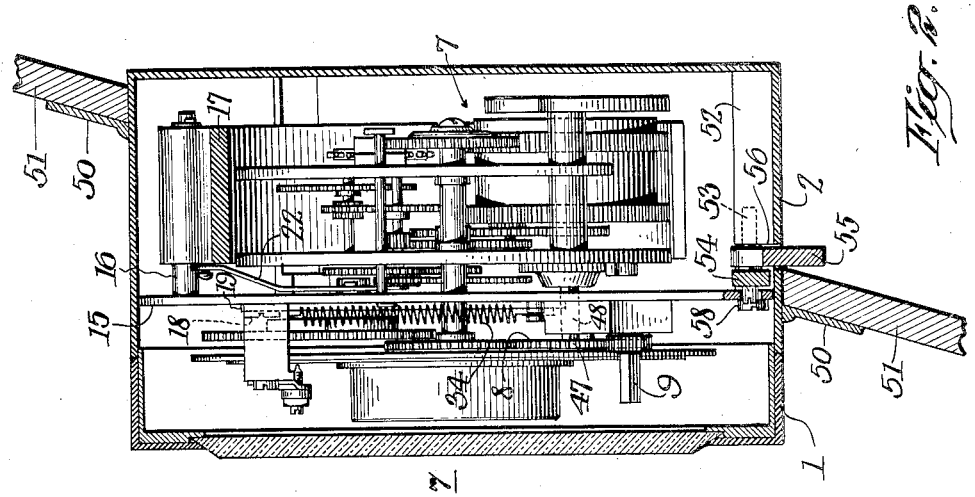
Inventor E. S. PHELPS.
VIBRATION RECORDER FOR AUTOMOBILES AND OTHER VEHICLES.
APPLICATION FILED AUG. 17, 1920.
1,408,635. Patented Mar. 7, 1922.
3 SHEETS—SHEET 2.
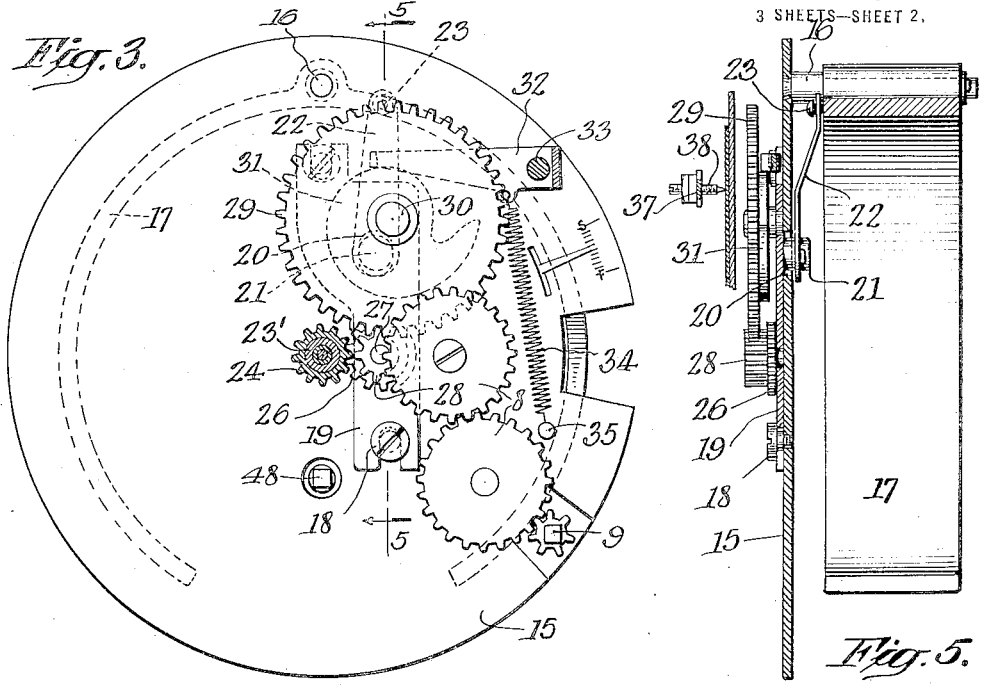
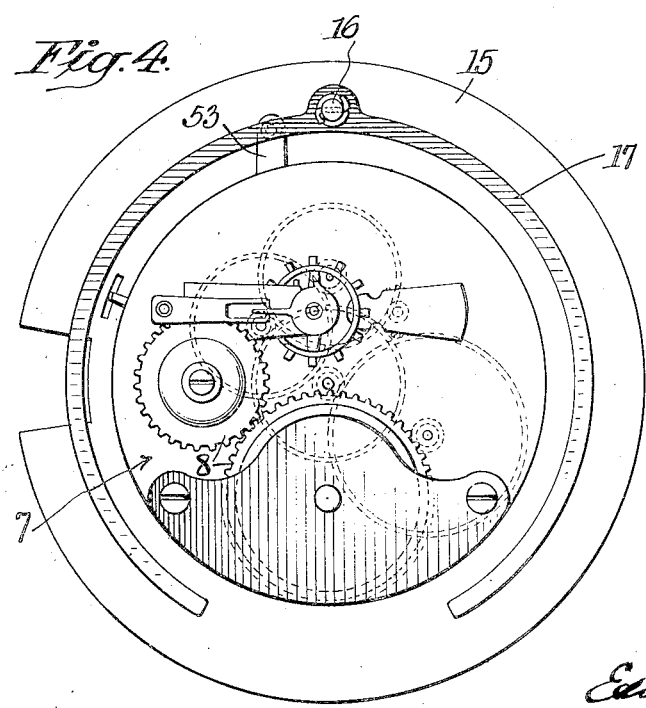
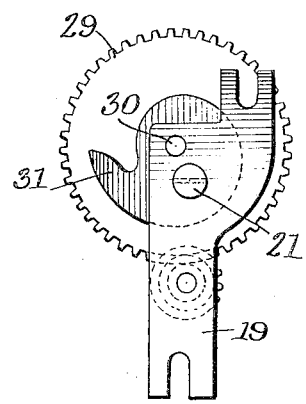

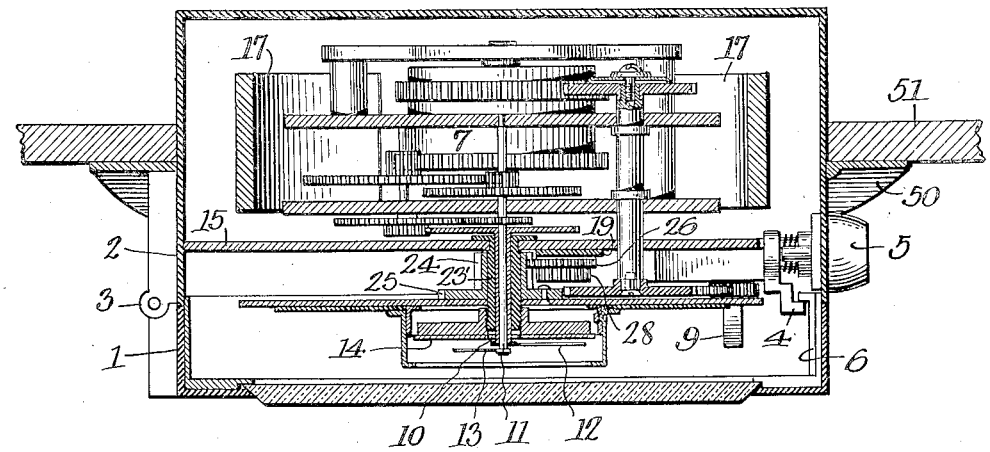
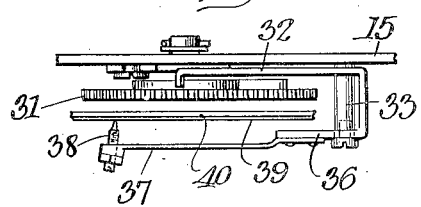
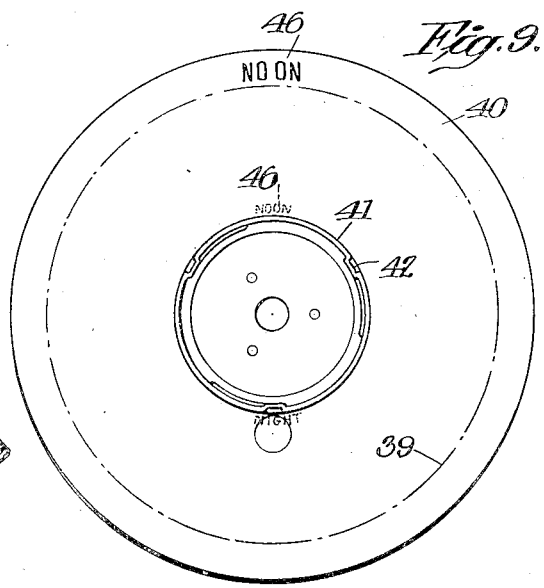
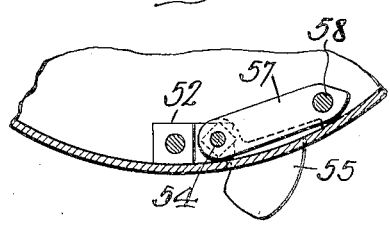
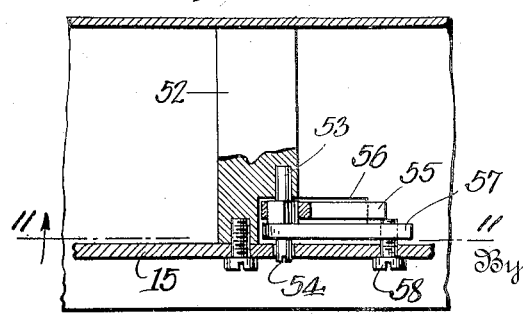
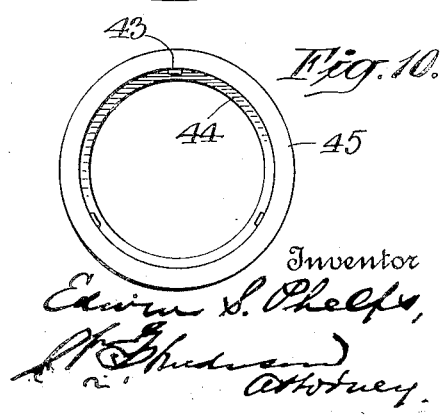

UNITED STATES PATENT OFFICE.

EDWIN SANFORD PHELPS, OF NEW YORK, N. Y.

VIBRATION RECORDER FOR AUTOMOBILES AND OTHER VEHICLES.

1,408,635.	Specification of Letters Patent.	Patented Mar. 7, 1922.

Application filed August 17, 1920. Serial No. 404,186.

*To all whom it may concern:*

Be it known that I, EDWIN S. PHELPS, a citizen of the United States, residing at New York, in the county of New York and State of New York, have invented certain new and useful Improvements in Vibration Recorders for Automobiles and other Vehicles; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to a device for automatically recording the running or movement of conveyances or vehicles by actuation of the recording means from oscillations of the conveyance or vehicle during the period of its use.

The object of the invention is to provide a recording member sensitive to the side oscillations or swing of the conveyance or vehicle so as to make the record; also to provide for securing the device in place on a conveyance or vehicle in such manner that it can only be removed by a person having access to the interior by means of a proper key.

The device is specially well adapted for affording the owners of automobiles protection against the unauthorized use of the vehicle, since it will furnish a record indicating the use of the same, and the period of its use. It also affords a removable record dial which need not be examined or replaced oftener than once a week unless sooner desired, thus giving to the owner the minimum of labor, time, thought and anxiety, and providing for him at the end of the week a correct record of the running of his automobile during the preceding seven days; and in the meantime requiring no attention, and not being subject to or making necessary any act on the part of the chauffeur to make the record of the use or running of the machine.

To the accomplishment of the foregoing and such other objects as may hereinafter appear the invention consists in the features hereinafter particularly described and then sought to be clearly defined by the claims, reference being had to the accompanying drawing forming a part hereof, and in which Figure 1 is a front elevation of the recorder, Figure 2 is a section through the casing on the line 2—2 of Figure 1, part of the contained mechanism being also shown in section and the rest in elevation the better to disclose the device, Figure 3 is a front elevation of the mechanism contained in the casing, certain parts being removed or broken away the better to disclose the remainder, Figure 4 is a rear elevation of the mechanism contained in the casing, Figure 5 is a section on the line 5—5 of Figure 3, Figure 6 is a detail rear view of a certain sliding plate used herewith and showing parts associated therewith, Figure 7 is a section on the line 7—7 of Figure 1, Figure 8 is a detail top view of a certain marking point and the parts immediately associated therewith, Figure 9 is a face view of the dial-plate used herewith, Figure 10 is a rear view of dial clamp or grip which serves to keep the dial in position on the dial plate, Figure 11 is a section of the lower part of the casing on the line 11—11 of Figure 12, Figure 12 is a view partly in section and partly in plan of a retaining device used to secure the invention in position on the conveyance or vehicle.

In the drawing, the numerals 1 and 2 indicate respectively the front and rear parts of a shell or casing of any approved pattern, which will contain the working parts of the recorder. These two parts are connected to each other by any suitable means, for instance, at one side by a hinge 3 and at the other by a sliding-locking bolt 4 controlled by a lock 5 and engaging, when locked, with a keeper 6 on the part 1.

In this casing is contained a suitable clock work mechanism 7 arranged to be wound through the medium of a winding train 8 actuated by rotating an arbor 9 by a suitable key. This clock work includes an hour arbor 10 and minute arbor 11 carrying the respective hour and minute hands 12 and 13 which traverse the face of a suitable clock dial 14.

As no claim is made to the parts so far described and they may be varied without departing from the present invention, a more detailed description thereof is not necessary.

Within the casing is a plate 15 from the upper part of which projects rearwardly a pin 16 whereon is pivoted a pendulum 17. Slidably mounted in front of the plate 15 by means of the screws 18 is a plate 19, which I term the sliding plate, and projecting rearward from this plate 18 through a slot 20 in the plate 15 is a stud 21. The stud 21 carries the lower end of a link 22, the upper end of the link being connected to the pendulum 17 in spaced relation to the pivot pin 16 or fulcrum by a screw 23. Thus oscillation of the pendulum will cause vertical reciprocation of the sliding plate.

Mounted on the hour arbor 10 is sleeve 23 which rotates with the arbor and on this sleeve is frictionally mounted a pinion 24 and gear 25, the two forming a unitary element as shown. The pinion 24 meshes with a gear 26 carried on an arbor 27 projecting from the sliding plate. A pinion 28 rotates integrally with the gear 26 and meshes with a gear 29 fixed to an arbor 30 which is mounted in the plate 19 and carries a snail or cam 31 which is likewise fixed to the arbor so that the gear 29 and snail 31 rotate in unison. An arm 32, pivoted on a pin 33 carried by the plate 15, rests on the snail and is held in position thereon by means of a spring 34, one end of the spring being connected to the arm and the other to a post or stud 35 fixed in the plate 15. Connected to this arm to move therewith is an arm 36 which carries a spring arm 37 having at its free end an adjustable marking point 38 which is pressed by the spring against a dial 39 carried by a dial plate 40 mounted on the gear 25. In order to hold the dial in position on the dial plate there projects from the dial plate an annulus 41 over which the dial fits, being provided with a central opening for that purpose, and in this annulus are formed the female elements 42 of a bayonet lock, the male elements 43 being carried on a retaining ring 44 which fits over the annulus and is provided with a flange 45 to bear against the dial and clamp it to the dial plate.

This dial may be made of any suitable material as of paper having a surface sensitive to the marking point and is divided by suitable markings to indicate hours and fractions of hours or the like. In order to adjust the dial 39 so that the position occupied by the marking point may be in accordance with the indications of the clock hands, suitable indicia such as are shown at 46 may be employed on the dial and dialplate and the dial may also be set to correct time by a setting train 47 meshing with the gear 25 and actuated from the arbor 48.

In order to attach the casing to the instrument board or other convenient place on the vehicle I provide a ring 50, which fits the casing closely and which is mounted on a part of the vehicle as, for instance, the instrument board 51, an opening being formed in the latter corresponding to the ring opening. Rotatably mounted in a suitable block 52 fixed in the casing is a pin or stud 53 having a slot 54 in its outer end for the reception of a screw driver bit. This pin carries an arm 55 which can move, by rotation of the pin, through a slot 56 in the casing so as to engage behind the instrument board 51 as shown in Figure 2. The pin also carries an arm 57 which, with the arm 55 protruded through the slot 56, is engaged by a locking set screw 58 so that no unauthorized person can remove the device from the instrument board as it is first necessary to unlock the casing and then remove the proper screw 58 before the pin 54 can be turned to retract the arm 55.

It is to be observed that the clock mechanism is preferably such as to continue in operation at least seven days without rewinding and that the gear tram for the snail is such that the latter will make one complete revolution in the same time that the dial plate 15 makes seven complete revolutions. Thus the marking point will, under the influence of the revolving snail, describe in one week a spiral having seven convolutions each of which corresponds to the elapsed time of one day. Moreover, so long as the vehicle is not in motion there will be no movement or oscillation of the pendulum and the marking point will describe a smooth continuous spiral arc but when the vehicle is in motion the pendulum will oscillate and the sliding plate will, by reason of its connection with the pendulum, reciprocate and cause oscillation of the marking point so that a broken line will be described thereby on the record dial. Thus the conditions of rest and motion of the vehicle will be automatically indicated on the record dial. It is to be noted that the reciprocation of the sliding plate is of such small amplitude that the engagement of the gears 24 and 26 is not affected thereby.

I have described with particularity the preferred details of construction and arrangement of parts but the invention is not restricted thereto as changes can be made so as to be within the scope of the appended claims.

Having described my invention and set forth its merits what I claim is—

1. In a vehicle movement recorder, means to support a continuously moving record receiving member, a marker mounted for substantially radial movement across the record receiving member, means to impart a progressive substantially radial movement to the marker, and means actuated by oscillations of the body to which the recorder is attached and arranged to effect reciprocations of the last mentioned means and thereby effect oscillatory movement of the marker.

2. In a vehicle movement recorder, means to support a continuously moving record receiving member, a marker mounted for substantially radial movement across the record receiving member, means to impart a progressive substantially radial movement to the marker, a pendulum supported to oscillate under the influence of oscillations of the body to which the recorder is attached, and an operative connection between the last mentioned means and said pendulum whereby to effect oscillations of the marker across the record receiving member.

3. In a vehicle movement recorder, means to support a continuously moving record receiving member, a marker mounted for movement across said member, means to move the marker progressively over a predetermined path, and other means actuated to oscillate under the influence of oscillations of the body to which the recorder is attached and arranged to effect oscillations of the last mentioned means and thereby cause similar oscillations of the marker.

4. In a vehicle movement recorder, means to support a continuously moving record receiving member, a marker mounted for movement in a prescribed path across said member, means to move the marker progressively along said path, a pendulum supported to oscillate under the influence of oscillations of the body to which the recorder is attached, and an operative connection between the last mentioned means and said pendulum arranged to effect oscillatory movement of the means whereby to cause oscillations of the marker.

5. In a vehicle movement recorder, means to support a continuously moving record receiving member, a marker mounted for movement in a prescribed path across said member, a snail or cam having a continuously rotary movement and engaging the marker to progressively move the same along its path, and means actuated to oscillate under the influence of oscillations of the body to which the recorder is attached and arranged to effect corresponding oscillations of the snail in a direction substantially radial to its direction of rotation whereby oscillations will be imparted to the marker.

6. In a vehicle movement recorder, means to support a continuously moving record receiving member, a marker mounted for movement in a prescribed path across said record receiving member, a snail or cam having a continuously rotary movement and engaging the marker to progressively move the same along its path, a pendulum supported to oscillate under the influence of oscillations of the body to which the recorder is attached, and means to operatively connect the pendulum and snail and effect reciprocations of the latter by oscillations of the pendulum and thereby oscillate the marker across the record receiving member.

7. In a vehicle movement recorder, means to support a continuously moving record receiving member, a marker mounted for movement in a prescribed path across said member, a continuously revolving cam or snail whereon said marker bears and whereby progressive movement of the marker along its path is effected, a reciprocatory sliding plate whereon the cam is mounted, and means actuated by oscillations of the body to which the recorder is attached and arranged to effect reciprocation of the sliding plate.

8. In a vehicle movement recorder, means to support a continuously moving record receiving member, a marker mounted for movement in a prescribed path across said member, a continuously revolving cam or snail whereon said marker bears and whereby progressive movement of the marker along its path is effected, a reciprocatory sliding plate whereon the cam is mounted, a pendulum supported to oscillate under the influence of oscillations of the body to which the recorder is attached, and a link connecting the sliding plate and pendulum whereby oscillation of the pendulum effects reciprocation of the plate with corresponding movement of the marker.

9. In a vehicle recorder, the combination with a recording instrument casing arranged to fit within an opening in a part of the vehicle body, of a circumferential flange to said casing and bearing against the vehicle body, and locking means secured within said casing and arranged to engage the vehicle body to prevent the casing from being withdrawn from said opening.

In testimony whereof I affix my signature in presence of two witnesses.

EDWIN SANFORD PHELPS.

Witnesses:
CLARA ANNE RYLEY,
LOUISA FLACH.